United States Patent
Backfolk et al.

(10) Patent No.: US 11,999,132 B2
(45) Date of Patent: Jun. 4, 2024

(54) HEAT SEALABLE PACKAGING MATERIAL COMPRISING MICROFIBRILLATED CELLULOSE AND PRODUCTS MADE THEREFROM

(71) Applicant: Stora Enso OYJ, Helsinki (FI)

(72) Inventors: Kaj Backfolk, Villmanstrand (FI); Isto Heiskanen, Imatra (FI); Esa Saukkonen, Lappeenranta (FI); Jukka Kankkunen, Imarta (FI); Ville Ribu, Lappeenranta (FI); Kimmo Nevalainen, Kotka (FI)

(73) Assignee: Stora Enso OYJ, Helsinki (FI)

(*) Notice: Subject to any disclaimer, the term of this patent is extended or adjusted under 35 U.S.C. 154(b) by 329 days.

(21) Appl. No.: 16/500,033

(22) PCT Filed: Mar. 28, 2018

(86) PCT No.: PCT/IB2018/052132
§ 371 (c)(1),
(2) Date: Oct. 1, 2019

(87) PCT Pub. No.: WO2018/185611
PCT Pub. Date: Oct. 11, 2018

(65) Prior Publication Data
US 2020/0171796 A1   Jun. 4, 2020

(30) Foreign Application Priority Data
Apr. 3, 2017 (SE) .................. 1750411-9

(51) Int. Cl.
*B32B 15/085* (2006.01)
*B32B 15/20* (2006.01)
*B32B 27/10* (2006.01)
*B65D 65/40* (2006.01)
*B65D 65/42* (2006.01)
*C08J 5/18* (2006.01)
*D21H 11/18* (2006.01)
*D21H 19/04* (2006.01)
*D21H 19/08* (2006.01)
*D21H 19/22* (2006.01)
*D21H 19/82* (2006.01)
*D21H 19/84* (2006.01)
*D21H 27/10* (2006.01)

(52) U.S. Cl.
CPC ............ *B32B 15/085* (2013.01); *B32B 15/20* (2013.01); *B32B 27/10* (2013.01); *B65D 65/40* (2013.01); *B65D 65/42* (2013.01); *C08J 5/18* (2013.01); *D21H 11/18* (2013.01); *D21H 19/04* (2013.01); *D21H 19/08* (2013.01); *D21H 19/22* (2013.01); *D21H 19/824* (2013.01); *D21H 19/84* (2013.01); *D21H 27/10* (2013.01); *B32B 2307/7244* (2013.01); *B32B 2439/70* (2013.01); *C08J 2323/06* (2013.01)

(58) Field of Classification Search
CPC ........ D21H 19/04; D21H 19/08; D21H 19/02; D21H 19/34; D21H 19/52; B32B 23/042; B32B 15/08; B32B 15/85; B32B 2262/062; B32B 2262/065; B32B 15/14; B32B 15/20; B32B 2262/06; B32B 2262/067; B32B 27/12; B65D 65/42
USPC ............................... 428/34.1–36.92
See application file for complete search history.

(56) References Cited

U.S. PATENT DOCUMENTS

| | | | | |
|---|---|---|---|---|
| 3,442,686 | A * | 5/1969 | Jones ...................... | B32B 27/00 428/336 |
| 3,972,467 | A * | 8/1976 | Whillock ................ | B32B 27/34 428/213 |
| 2006/0264135 | A1 * | 11/2006 | Netravali ................ | B32B 27/04 442/123 |
| 2007/0298196 | A1 * | 12/2007 | Petersen ............... | B32B 27/325 428/34.2 |
| 2010/0024998 | A1 * | 2/2010 | Wildlock ................ | D21H 11/18 162/124 |
| 2011/0081554 | A1 * | 4/2011 | Ankerfors ............. | C09D 103/10 428/535 |
| 2011/0088860 | A1 * | 4/2011 | Heijnesson-Hulten ..................... D21H 13/00 162/164.1 |

(Continued)

FOREIGN PATENT DOCUMENTS

| | | |
|---|---|---|
| CN | 102470649 A | 5/2012 |
| CN | 106457757 A | 2/2017 |

(Continued)

OTHER PUBLICATIONS

"Periodic Table | Aluminium—Element Information, Properties and Uses", Royal Society of Chemistry, https://www.rsc.org/periodic-table/element/13/aluminium (Year: 2021).*

(Continued)

*Primary Examiner* — Michael C Romanowski

(74) *Attorney, Agent, or Firm* — Greer, Burns & Crain, Ltd.

(57) ABSTRACT

The present invention is directed to a packaging material comprising a layer of microfibrillated cellulose (MFC) and an aluminum layer having a thickness of 0.1-20 μm, wherein the layer comprising MFC and/or the aluminum layer has been laminated or extrusion coated on at least one side with a thermoplastic polymer and wherein the amount of aluminum is sufficient to make the packaging material heat sealable by induction. The MFC layer contains at least 60% by weight of microfibrillated cellulose.

11 Claims, No Drawings

(56) References Cited

U.S. PATENT DOCUMENTS

| | | | |
|---|---|---|---|
| 2012/0100320 A1* | 4/2012 | Toft | B32B 27/08 |
| | | | 428/35.6 |
| 2012/0117921 A1* | 5/2012 | Toft | B29C 66/1122 |
| | | | 53/452 |
| 2012/0251818 A1* | 10/2012 | Axrup | B32B 27/10 |
| | | | 428/326 |
| 2013/0004687 A1 | 1/2013 | Oomori et al. | |
| 2013/0053454 A1* | 2/2013 | Heiskanen | C09D 101/284 |
| | | | 106/501.1 |
| 2013/0202870 A1* | 8/2013 | Malmborg | C08K 7/02 |
| | | | 428/514 |
| 2013/0209772 A1* | 8/2013 | Sandstrom | B32B 27/306 |
| | | | 428/220 |
| 2013/0260143 A1 | 10/2013 | Oomori et al. | |
| 2016/0376750 A1* | 12/2016 | Miikki | D21H 19/84 |
| | | | 428/201 |
| 2017/0120556 A1 | 5/2017 | Nyman et al. | |
| 2018/0319143 A1* | 11/2018 | Neagu | B32B 29/02 |
| 2019/0322428 A1* | 10/2019 | Lindstedt | C09D 7/61 |
| 2021/0017717 A1 | 1/2021 | Backfolk et al. | |

FOREIGN PATENT DOCUMENTS

| | | | | |
|---|---|---|---|---|
| CN | 111386196 A | | 7/2020 | |
| EP | 2451644 | | 5/2012 | |
| JP | 2015024540 | | 2/2015 | |
| SE | 1351552 A1 | | 11/2014 | |
| SE | 1351552 | * | 12/2014 | B65D 81/24 |
| WO | 2008076056 A1 | | 6/2008 | |
| WO | WO-2010017958 A1 | * | 2/2010 | B32B 23/08 |
| WO | WO 2011003566 | * | 1/2011 | B32B 27/10 |
| WO | 2011078770 A1 | | 6/2011 | |
| WO | WO 2015/091535 | * | 6/2015 | B32B 15/08 |
| WO | 2017046754 | | 3/2017 | |

OTHER PUBLICATIONS

International Searching Authority, Written Opinion of the International Searching Authority, PCT/IB2018/052132, dated Oct. 11, 2018.

International Searching Authority, International Search Report, PCT/IB2018/052132, dated Oct. 11, 2018.

Chinga-Carrasco, G., "Cellulose fibres, nanofibrils and microfibrils,: The morphological sequence of MFC components from a plant physiology and fibre technology point of view," Nanoscale research letters 2011, 6:417.

Fengel, D., "Ultrastructural behavior of cell wall polysaccharides," Tappi J., Mar. 1970, vol. 53, No. 3.

* cited by examiner

HEAT SEALABLE PACKAGING MATERIAL COMPRISING MICROFIBRILLATED CELLULOSE AND PRODUCTS MADE THEREFROM

This application is a U.S. National Phase under 35 U.S.C. § 371 of International Application No. PCT/IB2018/052132 filed Mar. 28, 2018, which claims priority under 35 U.S.C. §§ 119 and 365 to Swedish Application No. 1750411-9, filed Apr. 3, 2017.

TECHNICAL FIELD

The present invention is directed to a packaging material comprising a layer of microfibrillated cellulose (MFC) and an aluminum layer having a thickness of 0.1-20 μm, wherein the layer comprising MFC and/or the aluminum layer has been laminated or extrusion coated on at least one side with a thermoplastic polymer and wherein the amount of aluminum is sufficient to make the board heat sealable by induction. The MFC layer contains at least 60% by weight of microfibrillated cellulose.

BACKGROUND

Packages used for sensitive objects such as liquid beverages need to have sufficient barrier properties. Typically, aluminum is used for these purposes and generally provides sufficient properties with regard to penetration of gas, such as oxygen. The aluminum layer is also an aroma barrier and plays an important function in heat sealing.

Induction is commonly used as a means to heat seal packages. This is based on the presence of a sufficient amount of conductive material to achieve the heat sealable properties.

One issue with the use of aluminum is that it poses an environmental challenge and it would be desirable to replace aluminum with renewable materials. However, it is essential to maintain the barrier properties of the material to the extent it is to be used in packages for e.g. liquids and it is also important that the material is sufficiently crack-resistant.

SUMMARY OF THE INVENTION

It has surprisingly been found that by using a layer of microfibrillated cellulose (MFC) and an aluminum layer and wherein the layer comprising MFC and/or the aluminum layer has been laminated or extrusion coated on at least one side with a thermoplastic polymer, it is possible to achieve a packaging material suitable for heat sealing using induction even with a very small amount of aluminum. Surprisingly, the packaging material comprising MFC provides sufficient barrier properties even at high humidity.

The present invention is thus directed to a packaging material comprising a layer of MFC and an aluminum layer having a thickness of 0.1-20 μm, wherein the layer comprising MFC and/or the aluminum layer has been laminated or extrusion coated on at least one side with a thermoplastic polymer and wherein the amount of aluminum is sufficient to make the board heat sealable by induction.

In one embodiment, a thermoplastic polymer has been laminated on both sides of the MFC layer.

The aluminum layer used in accordance with the present invention is continuous. The thickness of the aluminum layer is 0.1-20 μm, such as 0.2-15 μm or 0.3-10 μm or 0.6-10 μm or 0.5-3.5 μm, such as 1-3 μm, such as 1.2-2.8 μm. In one embodiment of the present invention, the amount of aluminum is in the range of from 1 g to 30 g per $m^2$ finished packaging material, such as from 3 g to 10 g per $m^2$ finished packaging material. The thickness of the aluminum layer can be determined by methods known in the art, such as by measuring optical density.

In one embodiment of the present invention, the oxygen transmission rate (OTR) of the MFC layer is less than 20 cc/$m^2$*day, preferably less than 15 cc/$m^2$*day measured at standard conditions (50% RH, 23° C.), at a grammage of 10-50 gsm. The OTR can be determined using methods known in the art.

In one embodiment of the present invention, the oxygen transmission rate (OTR) of the packaging material according to the present invention, i.e. the final product to be used in a package, is less than 5 cc/$m^2$*day, preferably less than 3 cc/$m^2$*day or less than 1.5 cc/$m^2$*day measured at standard conditions (50% RH, 23° C.). The OTR can be determined using methods known in the art.

The packaging material according to the present invention can be subjected to printing through a reel to reel or reel to sheet or sheet fed printing process, but can also be subjected to off-line surface treatment with other technologies such as flexogravure, rotogravure, reverse rotogravure, silk screen printing, inkjet printing, offset printing (lithography), spray, curtain, foam or other printing or surface treatment techniques.

Depending on the amount of aluminum used, the packaging material according to the present invention may be biodegradable and/or compostable. In this context, compostability is defined in accordance with ISO 18606, i.e. constituents in the whole material which are present at concentrations of less than 1% do not need to demonstrate biodegradability. However, the sum of such constituents shall not exceed 5%. Biodegradability is defined as follows: the ultimate aerobic biodegradability shall be determined for the whole material or for each organic constituent which is present in the material at a concentration of more than 1% (by dry mass). Constituents present at levels between 1 to 10% shall be tested individually.

DETAILED DESCRIPTION

The microfibrillated cellulose used according to the present invention can be prepared using methods known in the art.

In one embodiment of the present invention, the MFC layer is formed in a paper making machine or according to a wet laid production method, by providing a suspension onto a wire and dewatering the web to form an intermediate thin substrate or said film. A suspension comprising microfibrillated cellulose is provided to form said film.

In one embodiment of the present invention, the MFC layer used in accordance with the present invention can be made according to any known processes described in the art such as wet laid methods, printing, extrusion, lamination etc.

Microfibrillated cellulose (MFC) shall in the context of the patent application mean a nano scale cellulose particle fiber or fibril with at least one dimension less than 100 nm. MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods.

The smallest fibril is called elementary fibril and has a diameter of approximately 2-4 nm (see e.g. Chinga-Carrasco, G., *Cellulose fibres, nanofibrils and microfibrils: The morphological sequence of MFC components from a plant*

*physiology and fibre technology point of view, Nanoscale research letters* 2011, 6:417), while it is common that the aggregated form of the elementary fibrils, also defined as microfibril (Fengel, D., *Ultrastructural behavior of cell wall polysaccharides*, Tappi J., March 1970, Vol 53, No. 3.), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregrates and cellulose microfibril aggregates. MFC can also be characterized by various physical or physical-chemical properties such as large surface area or its ability to form a gel-like material at low solids (1-5 wt %) when dispersed in water. The cellulose fiber is preferably fibrillated to such an extent that the final specific surface area of the formed MFC is from about 1 to about 300 $m^2/g$, such as from 1 to 200 $m^2/g$ or more preferably 50-200 $m^2/g$ when determined for a freeze-dried material with the BET method.

Various methods exist to make MFC, such as single or multiple pass refining, pre-hydrolysis followed by refining or high shear disintegration or liberation of fibrils. One or several pre-treatment step is usually required in order to make MFC manufacturing both energy efficient and sustainable. The cellulose fibers of the pulp to be supplied may thus be pre-treated enzymatically or chemically, for example to reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CM), aldehyde and/or carboxyl groups (cellulose obtained by N-oxyl mediated oxydation, for example "TEMPO"), or quaternary ammonium (cationic cellulose). After being modified or oxidized in one of the above-described methods, it is easier to disintegrate the fibers into MFC or nanofibrillar size fibrils.

The nanofibrillar cellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated. MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper.

The above described definition of MFC includes, but is not limited to, the new proposed TAPPI standard W13021 on cellulose nanofibril (CNF) defining a cellulose nanofiber material containing multiple elementary fibrils with both crystalline and amorphous regions.

According to another embodiment, the suspension may comprise a mixture of different types of fibers, such as microfibrillated cellulose, and an amount of other types of fiber, such as kraft fibers, fines, reinforcement fibers, synthetic fibers, dissolving pulp, TMP or CTMP, PGW, etc.

The suspension may also comprise other process or functional additives, such as fillers, pigments, wet strength chemicals, dry strength chemicals, retention chemicals, cross-linkers, softeners or plasticizers, adhesion primers, wetting agents, biocides, optical dyes, fluorescent whitening agents, de-foaming chemicals, hydrophobizing chemicals such as AKD, ASA, waxes, resins etc. Additives can also be added using a size press.

There are several methods for preparing a film of MFC, including wire forming and cast forming. In wire forming, a suspension, comprising microfibrillated cellulose, is dewatered on a porous surface to form a fibrous web. A suitable porous surface is e.g. wire in a paper machine. The fibrous web is then dried in a drying section in a paper machine to form the MFC film, wherein the film has a first side and a second side. The papermaking machine that may be used in the process according to the present invention may be any type of machine known to the skilled person used for the production of paper, paperboard, tissue or similar products, alternatively for example a modified or non-conventional papermaking machine.

The furnish is placed onto the wire and then a web is formed, which may be dewatered to form an intermediate thin substrate or film. In cast forming, the suspension, comprising MFC, is applied on a supporting medium with a non-porous surface. The non-porous surface is e.g. a plastic or metal belt on which the suspension is evenly spread and the MFC film is formed during drying. The MFC film is then peeled off from the supporting medium in order to form a stand-alone film, wherein the film has a first side and a second side.

According to the present invention, the MFC layer and/or the aluminum layer is laminated or extrusion coated or dispersion coated with a thermoplastic polymer. The thermoplastic film typically has a glass transition temperature ($T_g$) of from 70° C. to 200° C. In one embodiment of the present invention, the thermoplastic polymer is selected from polyethylene (PE), polypropylene (PP), high-density polyethylene (HDPE), low-density polyethylene (LDPE), linear-low density polyethylene (LLDPE), polylactic acid (PLA), polyglycolide (PGA), ethylene vinyl acetate (EVA), ethylene vinyl alcohol (EVOH), polyamide (PA), ionomers (e.g. Surlyn) or combinations thereof. The thermoplastic film is typically present at at least 5 $g/m^2$, such as at least 15 $g/m^2$, such as at least 20 $g/m^2$ or at least 30 $g/m^2$.

In one embodiment of the present invention, the MFC layer is laminated with the thermoplastic polymer. The lamination can be carried out using methods known in the art.

The amount of aluminum in the aluminum layer according to the present invention is such that it is sufficient to make the packaging material heat sealable using induction. The heat sealing can be performed using methods and equipment known in the art.

A final liquid packaging board comprising the packaging material according to the present invention may comprise several layers. In one embodiment, the product has the following structure: PE/board/MFC/Al/PE, i.e. the layers are the following: a polyethylene (PE) layer, a layer of a conventional board material, a layer of microfibrillated cellulose MFC, an aluminum layer with an amount of aluminum sufficient to make the product heat sealable by induction, and a layer of PE. In one embodiment, the product has the following structure: PE/board/Al/MFC/PE, i.e. the layers are the following: a polyethylene (PE) layer, a layer of a conventional board material, a layer of aluminum, a layer of microfibrillated cellulose MFC, and a layer of PE. In one embodiment, the product has the following structure: PE/board/PE/MFC/Al/PE, i.e. the layers are the following: a polyethylene (PE) layer, a layer of a conventional board material, a layer of polyethylene (PE), a layer of microfibrillated cellulose MFC, an aluminum layer and a layer of PE. A person skilled in the art would recognize that other structures are possible. The grammage of a structure as described above is typically in the range of 180-500 g/m².

In view of the above detailed description of the present invention, other modifications and variations will become apparent to those skilled in the art. However, it should be apparent that such other modifications and variations may be effected without departing from the spirit and scope of the invention.

The invention claimed is:

1. A packaging material comprising:
   a layer that comprises at least 60% by weight of microfibrillated cellulose, and
   a continuous aluminum layer having a thickness of 1 to less than 3 μm and an amount of aluminum of 3 to 10 g/m² packaging material,
   wherein the layer comprising microfibrillated cellulose is laminated or extrusion coated with a thermoplastic polymer in an amount of at least 5 g/m² and the amount of aluminum is sufficient to make the packaging material heat sealable by induction;
   wherein the layer comprising microfibrillated cellulose has a grammage between 10 to 50 g/m² and an oxygen transmission rate of less than 20 cm³/m²·day (50% RH, 23° C.); and
   wherein the packaging material exhibits an oxygen transmission rate of less than 5 cm³/m²·day (50% RH, 23° C.).

2. The material according to claim 1, wherein said layer comprising microfibrillated cellulose has been laminated with the thermoplastic polymer.

3. The material according to claim 2, wherein said thermoplastic polymer is polyethylene.

4. The material according to claim 1, wherein said layer comprising microfibrillated cellulose has been extrusion coated with the thermoplastic polymer.

5. The material according to claim 4, wherein said thermoplastic polymer is polyethylene.

6. The material according to claim 1, wherein the material comprises a structure of:
   a first layer comprising a thermoplastic polymer;
   a second layer comprising a board material;
   a third layer comprising the aluminum layer;
   a fourth layer comprising the layer of microfibrillated cellulose; and,
   a fifth layer comprising the thermoplastic polymer laminated or extrusion coated on the layer of microfibrillated cellulose,
   wherein the second layer is between the first layer and third layer, the third layer is between the fourth layer and second layer, and the fourth layer is between the third layer and the fifth layer.

7. The material according to claim 6, wherein the material has a grammage in a range of 180 to 500 g/m².

8. The material according to claim 1, wherein the material comprises a structure of:
   a first layer comprising a thermoplastic polymer;
   a second layer comprising a board material;
   a third layer comprising the thermoplastic polymer laminated or extrusion coated on the layer of microfibrillated cellulose;
   a fourth layer comprising the layer of microfibrillated cellulose; and,
   a fifth layer comprising the aluminum layer,
   wherein the second layer is between the first layer and third layer, the third layer is between the fourth layer and second layer, and the fourth layer is between the third layer and the fifth layer.

9. The material according to claim 8, further comprising:
   a sixth layer comprising a thermoplastic polymer, wherein the fifth layer is between the fourth layer and the sixth layer.

10. The material according to claim 8, wherein the material has a grammage in a range of 180 to 500 g/m².

11. A method of manufacturing the packaging material according to claim 1, comprising the steps of
   a) preparing the layer comprising at least 60% by weight of microfibrillated cellulose having a grammage of between 10 to 50 g/m² and an oxygen transmission rate of less than 20 cm³/m²·day (50% RH, 23° C.);
   b) providing the continuous aluminum layer having a thickness of 1 to less than 3 μm in an amount of 3 to 10 g/m² packaging material to render the packaging material heat sealable by induction;
   c) combining the layers of step a) and step b); and
   d) laminating or extrusion coating the layer of step a) with the thermoplastic polymer in an amount of at least 5 g/m²,
   wherein the packaging material exhibits an oxygen transmission rate of less than 5 cm³/m²·day (50% RH, 23° C.).

* * * * *